(12) United States Patent
Haba et al.

(10) Patent No.: US 6,425,667 B1
(45) Date of Patent: Jul. 30, 2002

(54) PROJECTION LENS UNIT AND PROJECTOR USING THE SAME

(75) Inventors: Shinji Haba, Shiojiri; Akitaka Yajima, Tatsuno-machi, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/552,753

(22) Filed: Apr. 19, 2000

(30) Foreign Application Priority Data

Apr. 23, 1999 (JP) ............................................ 11-116406

(51) Int. Cl.[7] ...................... G03B 21/14; G03B 21/22; G02B 15/14; G02B 3/00; G02B 3/02

(52) U.S. Cl. ...................... 353/100; 353/119; 359/703; 359/649; 359/720

(58) Field of Search ................................ 353/100, 101, 353/119, 122; 359/703, 704, 648–651, 720

(56) References Cited

U.S. PATENT DOCUMENTS 5,860,719 A * 1/1999 Suzuki et al. .................. 353/61
6,075,660 A * 6/2000 Miyamoto et al. .......... 359/819

* cited by examiner

*Primary Examiner*—Russell Adams
*Assistant Examiner*—Melissa Koval
(74) *Attorney, Agent, or Firm*—Oliff & Berridge, PLC

(57) ABSTRACT

A projection lens unit is provided that is reduced in size and profile. The projection lens unit may include a plurality of lenses of which at least one lens disposed at the base end opposite to the projection direction is cut away at the upper portion thereof. The surface of the cut-away portion of the lens is made flat. With this arrangement, a space above the lens can be used when a cooling fan is disposed above an electrooptical unit provided in the vicinity of the projection lens unit, whereby a projector can be reduced in size and profile, because the height of the projector can be reduced because it is not necessary to provide an additional space for receiving the cooling fan in the projector.

12 Claims, 8 Drawing Sheets

PROJECTION LENS UNIT AND PROJECTOR USING THE SAME

BACKGROUND OF THE INVENTION

1. Field of Invention

The present invention relates to a projection lens unit including a plurality of lenses disposed along a given axis, which enlarges and projects an input optical image, and relates to a projector using the projection lens unit.

2. Description of Related Art

Hitherto, a projector has been known which includes a light source, an electrooptical unit for forming an optical image by using a light beam from the light source, and a projection lens unit for enlarging and projecting the image formed by the electrooptical unit.

The projector is widely used for presentation by multimedia in public meetings, such as conferences, academic meetings, and exhibitions.

The projector is maintained in an installed manner in a conference room, or the like, for presentation, or is brought to the conference room as needed. The projector may occasionally be removed to another place to be stored after use. Therefore, the portability must be improved so as to be easily transported. The device is required to be reduced in size and to have a low-profile.

SUMMARY OF THE INVENTION

Accordingly, the present invention provides a projection lens unit enabling a projector, which is reduced in size and which has a low-profile, and to provide a projector using the projection lens unit. A projection lens unit according to the present invention may include a plurality of lenses which are disposed along a given axis, and enlarges and projects an input image. At least one of the plurality of lenses disposed at the base end opposite to the projection direction is formed to be cut away at the upper portion.

In the projection lens unit according to the invention, the height of a member which supports the projection lens unit can be reduced because of the lens being cut away at the upper portion and the cut-away surface being made substantially flat. A component, such as a cooling fan, can be mounted without interfering with the lens, over an electrooptical unit disposed in the vicinity of the base end of the projection lens unit. With this arrangement, the height of a projector including the projection lens unit can be reduced, and it is not necessary to provide an additional space in the projector for receiving a cooling fan, or the like, whereby the projector can be designed to have a reduced size and a low-profile.

When the projector is configured so that the center of an image-forming region of the electrooptical unit for forming an optical image in accordance with image information is disposed below the intersection of a line extending from the axis of the projection lens unit and an optical modulation unit, the optical image from the electrooptical unit is applied to a point below the axis, transmitted through the projection lens unit, and projected to be expanded toward an area higher than the axis. Therefore, the optical image is enlarged and projected on a projection area without any problem when a lens disposed at the base end opposite to the projection direction is cut away at the upper portion.

According to the invention, a flange, which protrudes toward the outside in the radial directions, is preferably provided at the periphery of the projection lens unit, the flange being provided at the base end toward the other end of the projection lens unit.

In a projection lens unit having such a flange, an opening, in which a base end of the projection lens unit is inserted, must be formed in a supporting member of the projection lens unit for the flange to be fixed to the supporting member by screws. In the projection lens unit according to the present invention, the lens is cut away at the upper portion thereof so that the size of the opening in the supporting member can be reduced, thereby miniaturizing the supporting member.

By fixing the projection lens unit in a manner described above, the projection lens unit can be fixed at a position in the vicinity of the center of gravity of the projection lens unit, whereby the projection lens unit can be fixed to the supporting member in a stable manner.

According to the present invention, the projector may include an electrooptical unit for forming an optical image in accordance with image information. The projector may include the projection lens unit described above, whereby the same effect is obtainable as in the projection lens unit.

The projector preferably includes a supporting member for supporting the projection lens unit at a base end thereof, and an opening through which the lens is inserted, the opening being formed in accordance with the shape of the base end of the projection lens unit.

With this arrangement, the ratio of the sizes of the opening to the supporting member can be reduced, whereby sufficient strength can be ensured when the supporting member is made thin.

In the projector according to the present invention, the center of an image-forming region of a light modulation unit forming the electrooptical unit may be disposed below the intersection of a line extending from the axis of the projection lens unit with the light modulation unit.

With this arrangement, as described above, the optical image is applied to a lower part and is emitted toward an upper part through the projection lens unit. The optical image can be enlarged and projected on a projection area without any problem when the lens disposed at the base end opposite to the projection direction is cut away at the upper portion thereof.

DETAILED DESCRIPTION OF PREFERRED EMBODIMENTS

Embodiments according to the present invention are described below based on the drawings.

(1) General configuration of the device

Figure 1:
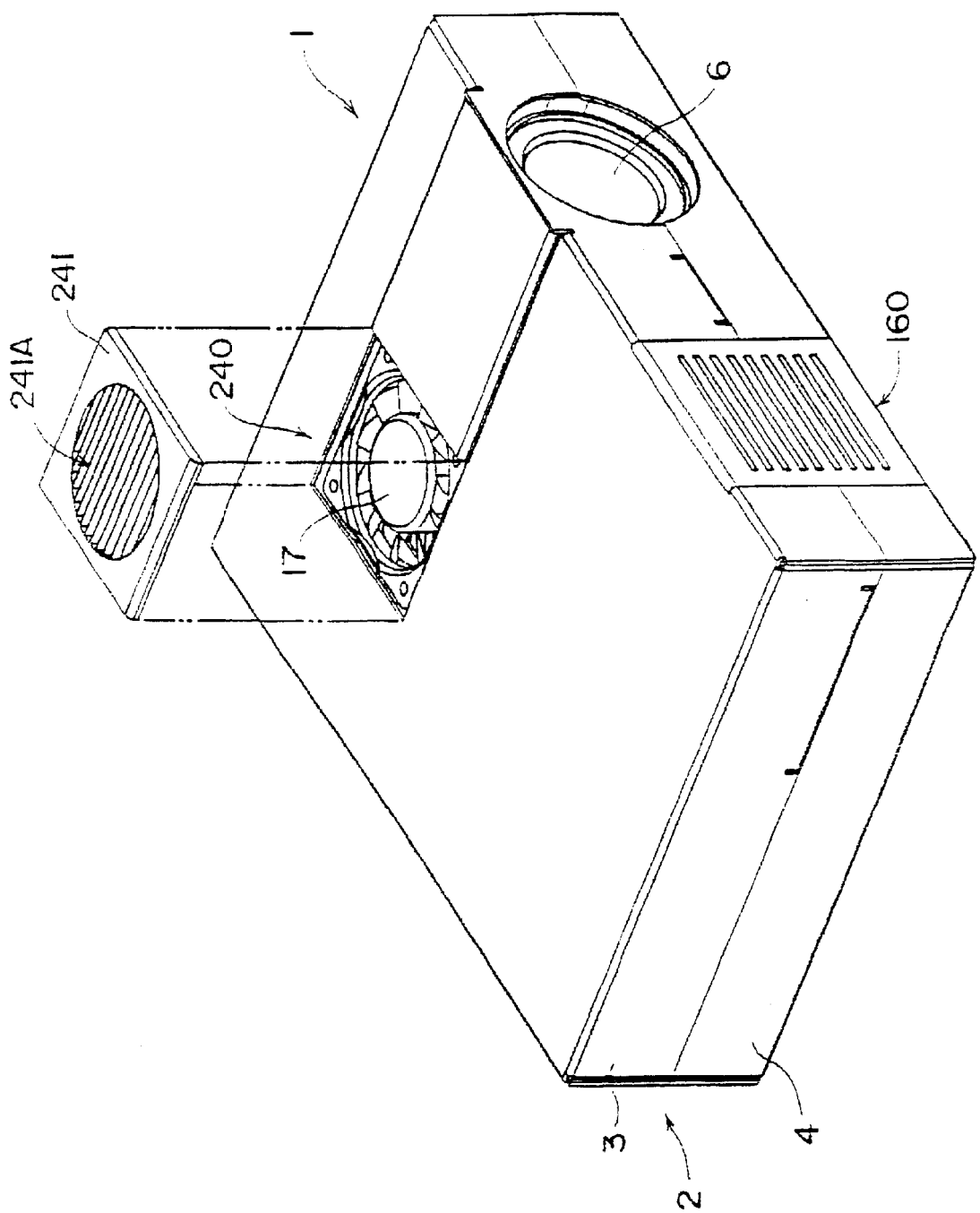
FIG. 1 is an external perspective view of a projector according to an embodiment of the present invention.

FIG. 1 is a schematic perspective view of a projector 1 according to the embodiment.

The projector 1 is of a type in which a luminous flux emitted by a lamp as a light source is split into three luminous fluxes having primary colors which are red (R), green (G), and blue (B). Each colored luminous flux is transmitted through and modulated by a liquid crystal panel included in an electrooptical unit. The modulated luminous fluxes of each color are recombined by a prism (color-combining optical system), and the recombined fluxes are displayed to be enlarged on a projection area through projection lens unit 6. Each component unit is received in an outer casing 2.

(2) Structure of the outer casing

The outer casing 2 includes, as major components, an upper case 3 covering the upper portion of the projector 1, a lower case 4 forming the bottom of the projector 1, and a rear case covering the back. The upper case 3 and the lower case 4 may be made by die-casting magnesium, and the rear case may be made of a resin.

The upper case 3 is provided with an air-inlet 240 in the upper face thereof substantially toward the right side (viewed from the front) from the center. The air-inlet 240 is covered by a filter-exchange cover 241 of a resin. The filter-exchange cover 241 is provided with slit-shaped holes 241A for introducing air from the outside into the projector 1 for cooling. An air filter (not shown) is provided under the filter-exchange cover 241. By removing the filter-exchange cover 241 from the upper face of the upper case 3, the air filter in the projector 1 can be removed and replaced.

The upper case 3 and the lower case 4 are provided, along the front sides thereof, with an air outlet 160 for discharging the air from the projector 1.

The outer casing 2 is provided with various input and output terminals such as an AC inlet (not shown) for receiving an external power supply.

(3) Internal structure of the projector

Figure 2:
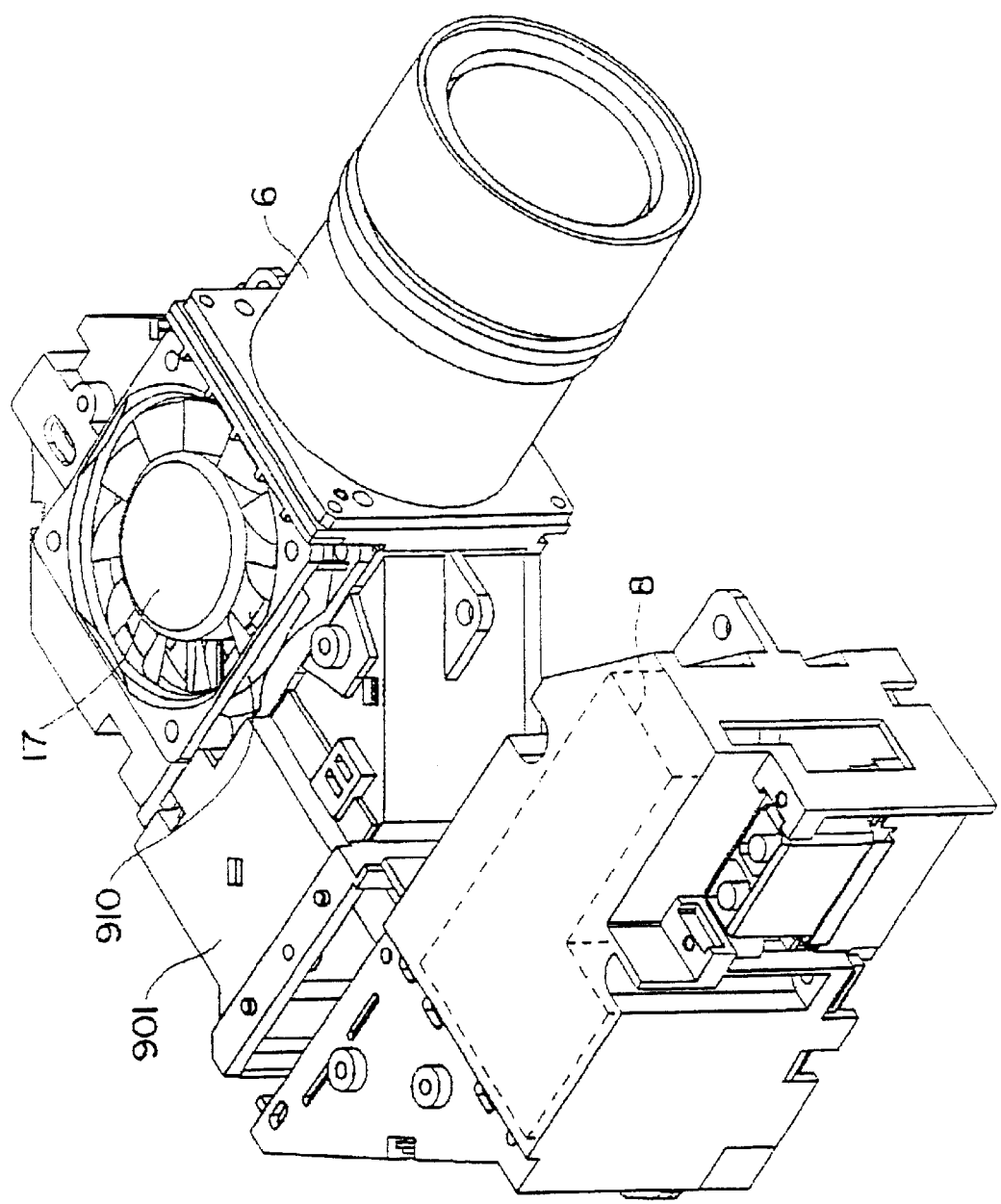
FIG. 2 is a perspective view of the internal structure of the projector according to the embodiment.
Figure 3:
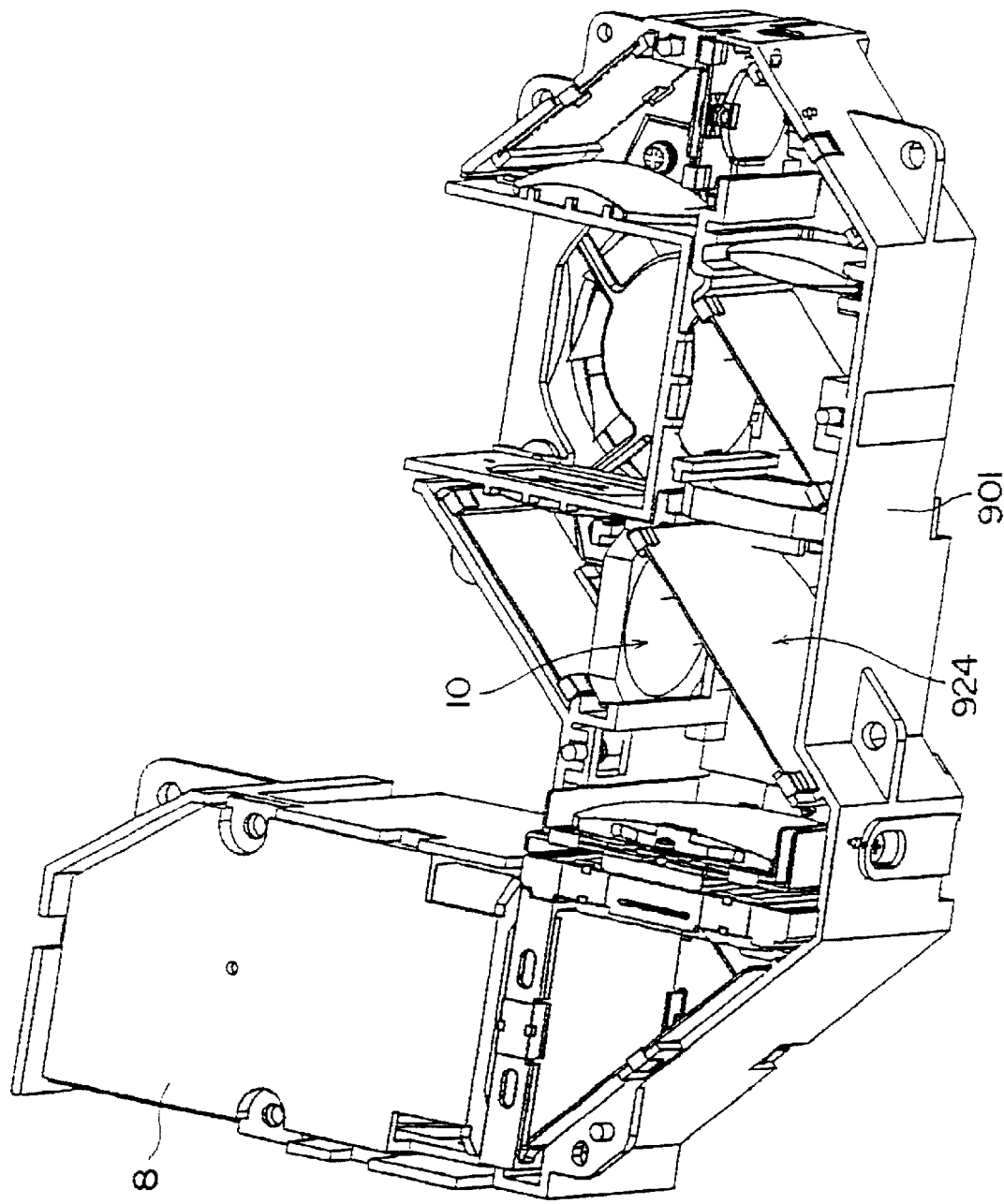
FIG. 3 is a perspective view of the internal structure of the projector according to the embodiment.
Figure 4:
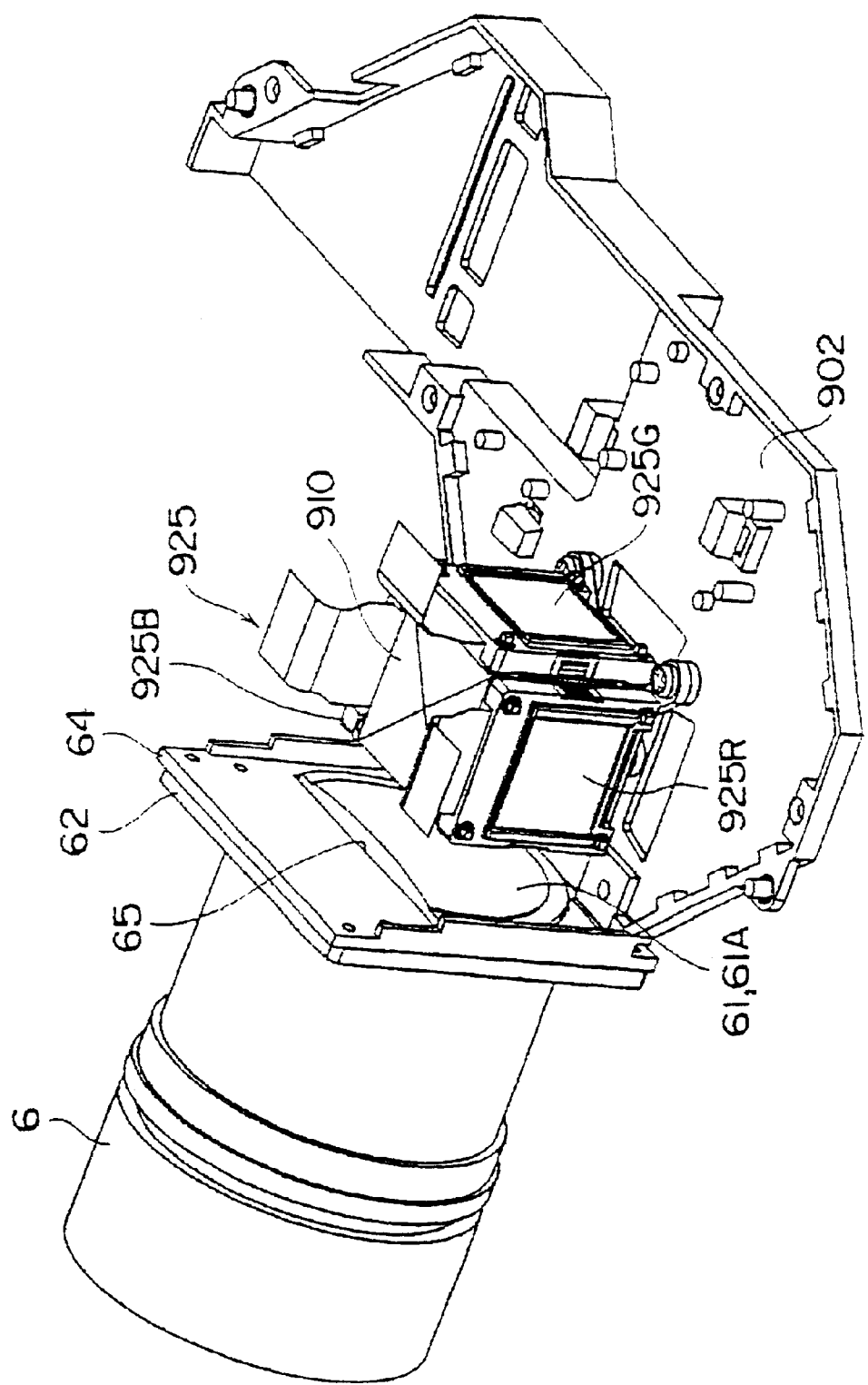
FIG. 4 is a perspective view of the internal structure of the projector according to the embodiment.

The internal structure of the projector 1 is shown in FIGS. 2 to 4.

As shown in these drawings, the projector 1 is provided therein with a light source lamp unit 8 at one end of the projection lens unit 6, with a space between the light source lamp unit 8 and the end of the projection lens unit 6, an optical unit 10 forming an optical system disposed between the projection lens unit 6 and the light source lamp unit 8, and a driver board (not shown) for driving an electrooptical unit 925 included in the optical unit 10. The projector 1 also includes a main board (not shown) for controlling the whole projector 1, and a power source unit (not shown) which transforms the voltage of an electrical source and supplies the power to the light source lamp unit 8, a cooling fan 17 disposed above the driver board, the main board, and the electrooptical unit 925, and a discharging fan (not shown) disposed at the front side of the light source lamp unit 8. The power source unit may be disposed being divided into a plurality of the components as needed according to the allocation space in the projector 1.

Figure 5:
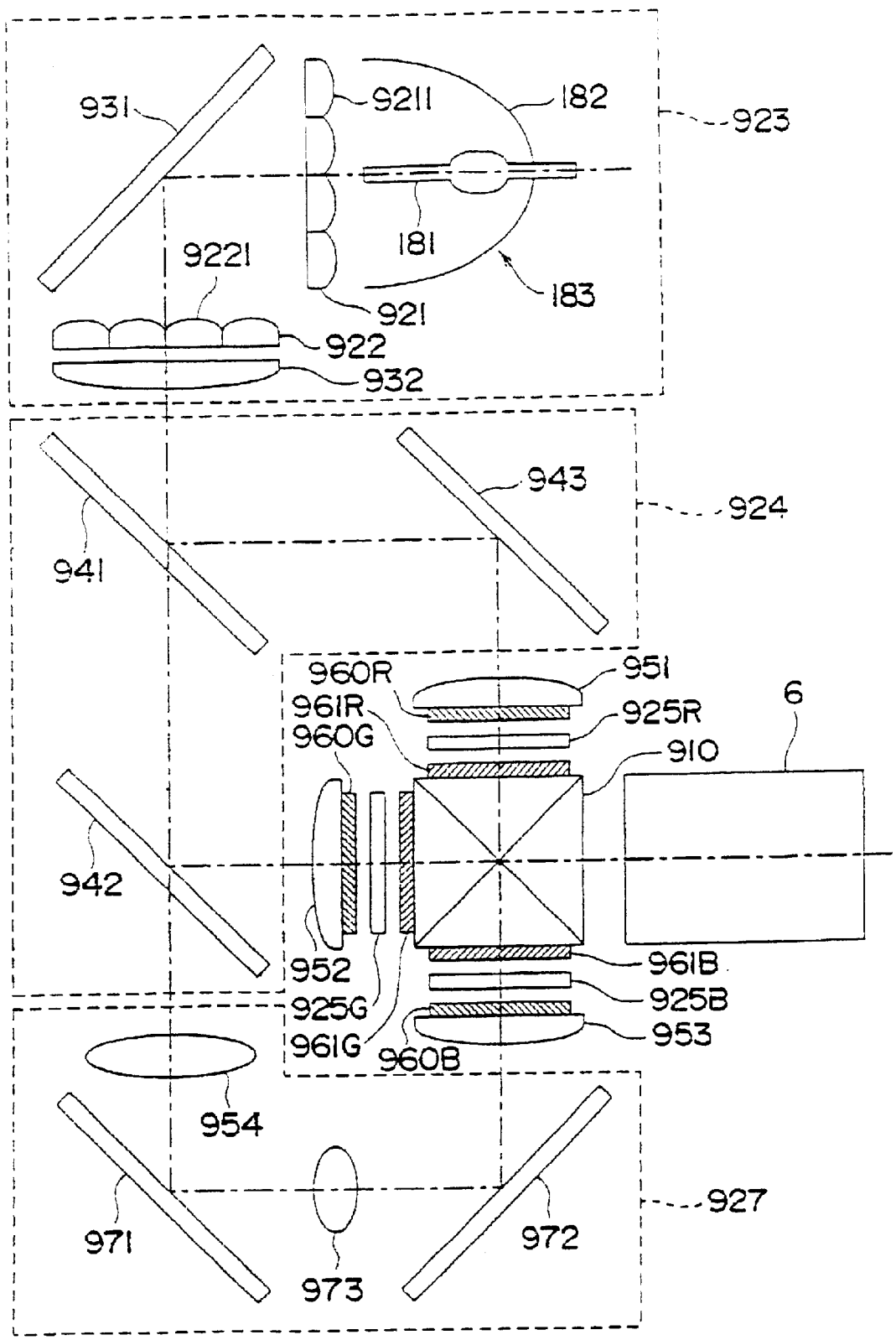
FIG. 5 is a schematic diagram of the configuration of an optical system according to the embodiment.

As shown in FIG. 5, the light source lamp unit 8, which is a light source of the projector 1, includes a light source 183 having a light source lamp 181 and a concave mirror 182, and a lamp housing (not shown) for receiving the light source 183. The light source lamp unit 8 is cooled by cooling air supplied by the cooling fan 17 and through a gap between the outer casing 2 and the projection lens unit 6. The cooling air, immediately after flowing in, cools the electrooptical unit 925, then flows to the right and left so as to cool substantially the whole area inside the projector 1, and the major portion of the air passes the light source lamp unit 8 and is discharged through the air outlet 160.

The optical unit 10 forms an optical image by optically processing the light beams from the light source lamp unit 8 in accordance with image information. The optical unit 10 includes an illumination optical system 923, a colored-light-beam decomposing optical system 924, the electrooptical unit 925, and a crossed dichroic prism 910 as a colored-light-beam combining optical system. Optical elements of the optical unit 10, other than the electrooptical unit 925 and the crossed dichroic prism 910, are held between upper and lower light guides 901 and 902 and are vertically sandwiched thereby. The upper light guide 901 and the lower light guide 902 are integrally assembled and are fixed to the lower case 4 by fixing screws. FIG. 3 is a view of the upper light guide 901 from the bottom thereof separated from the lower light guide 902.

As shown in FIG. 4, the rectangular parallelepiped crossed dichroic prism 910 is fixed to the upper face of the lower light guide 902 by fixing screws. Liquid crystal panels 925R, 925G, and 925B, which form the electrooptical unit 925, are fixed to three sides of the crossed dichroic prism 910 by a fixing material.

The driver board (not shown) for driving and controlling the liquid crystal panels 925R, 925G, and 925B is provided above the optical unit 10. The main board (not shown) provided with a control circuit for controlling the whole projector 1 is disposed in a vertical manner at the rear side of the optical unit 10. The main board and the driver board disposed perpendicular to each other are electrically connected to each other. An AV board provided with the input terminals is disposed in the same vertical manner as in the main board, and is electrically connected to the main board.

(4) Configuration of the optical system

An optical system of the projector 1, that is, the optical unit 10, is described as follows with reference to FIG. 5 which is a schematic diagram thereof.

As described above, the optical unit 10 includes the colored-light-beam decomposing optical system 924 having the illumination optical system 923, dicroic mirrors 941 and 942, and a reflecting mirror 943, and a relay optical system 927 having reflecting mirrors 971 and 972, an incidence-side lens 954, and a relay lens 973. The optical unit 10 also includes three field lenses 951, 952, and 953, the three liquid crystal panels 925R, 925G, and 925B, the crossed dichroic prism 910, and the projection lens unit 6. Incidence-side polarizing plates 960R, 960G, and 960B are disposed at the incidence-side of the liquid crystal panels 925R, 925G, and 925B, respectively. At the emission-side, emission-side polarizing plates 961R, 961G, and 961B are disposed.

The illumination optical system 923 includes the light source 183 for emitting substantially parallel light beams, a first lens array 921, a second lens array 922, an integrating lens 932, and a reflecting mirror 931. The illumination optical system 923 is an integrator-illumination optical system which substantially evenly illuminates image forming regions of the three liquid crystal panels 925R, 925G, and 925B.

The light source 183 includes the light source lamp 181 which emits, as a radial beam emitter, radial light beams, and the concave mirror 182 which converts the radial light beams from the light source lamp 181 into substantially parallel light beams and emits the same. Generally, a tungsten halogen lamp, a metal halide lamp, or a high pressure mercury-vapor lamp is used as the light source lamp 181. A parabolic mirror or an ellipsoidal mirror is preferably used as the concave mirror 182.

The first lens array 921 includes small lenses 9211, having a substantially rectangular outline, aligned in a matrix having M rows and N columns. The small lenses 9211 split the parallel luminous flux incident from the light source into a plurality (M×N) of split luminous fluxes, and applies the split luminous fluxes in the vicinity of the second lens array 922 to form an image. Each small lens 9211 has a shape substantially the same as the shape of the image-forming region of each of the liquid crystal panels 925R, 925G, and 925B. For example, when the image-forming region of the liquid crystal panel has an aspect ratio (the ratio of the width to the height) of 4:3, the aspect ratio of each small lens is set to 4:3.

The second lens array 922 includes small lenses 9221 aligned in a matrix having M rows and N columns so as to be associated with the small lenses 9211 included in the first lens array 921. The second lens array 922 arranges the center axes of the split luminous fluxes (principal rays) emitted by the first lens array 921 so that the principal rays are applied perpendicularly to the incidence plane of the integrating lens 932. The integrating lens 932 integrates the plurality of split luminous fluxes on the three liquid crystal panels 925R, 925G, and 925B. The field lenses 951, 952, and 953 convert the split luminous fluxes to be applied to the liquid crystal panels 925R, 925G, and 925B into luminous fluxes parallel to the center axis (principal ray) of each split luminous flux. As shown in FIG. 5, the second lens array 922 is disposed to be inclined with respect to the first lens array 921 by 90 degrees, the reflecting mirror 931 being disposed therebetween. The reflecting mirror 931 guides the luminous flux emitted by the first lens array 921 to the second lens array 922. The reflecting mirror 931 is not always required depending on the configuration of the illumination optical system. For example, it is not necessary when the light source, the first lens array 921, and the second lens array 922 are disposed opposing each other along a line.

In the optical unit 10 shown in FIG. 5, the substantially parallel luminous flux is split into a plurality of split luminous fluxes by the first and second lens arrays 921 and 922 which form an integrator optical system. The split luminous fluxes from the first lens array 921 are applied, by the integrating lens 932, substantially in an integrated fashion on the image-forming regions of the liquid crystal panels 925R, 925G, and 925B. The liquid crystal panels 925R, 925G, and 925B are substantially evenly illuminated at the surface thereof.

The colored-light-beam decomposing system 924 including two dichroic mirrors 941 and 942 and the reflecting mirror 943 splits the light beams from the integrating lens 932 into three colored light beams of red, green, and blue. A first dichroic mirror 941 reflects the red beam component and transmits the green and blue beam components of the luminous flux from the illumination optical system 923. The red light beams reflected by the first dichroic mirror 941 are again reflected by the reflecting mirror 943, transmitted through the field lens 951, and applied to the red liquid crystal panel 925R. The field lens 951 converts each split luminous flux from the second lens array 922 into a luminous flux parallel to the central axis (principal ray) of the split luminous flux. The field lenses 952 and 953 provided in front of the liquid crystal panels 925G and 925B have the same function.

The green light beams separated from the green and blue light beams transmitted through the first dichroic mirror 941 are reflected by a second dichroic mirror 942, transmitted through the field lens 952, and applied to the green liquid crystal panel 925G. The blue light beams are transmitted through the second dichroic mirror 942, through the relay optical system 927 including the incidence-side lens 954, the relay lens 973, and the reflecting mirror 972, and through the field lens 953. Thereafter, the blue light beams are applied to the blue liquid crystal panel 925B. The relay optical system 927 for the blue light beams is provided for preventing the efficiency in usage of the light from reducing due to the light spreading which is likely to occur because the optical path of blue light beams is longer than that of the other color light beams. That is, the relay optical system 927 is provided in order to transmit, as it is, the split light flux incident on the incidence-side lens 954 to the field lens 953.

The incidence-side polarizing plate 960R and the emission-side polarizing plate 961R are disposed at the incidence-side surface and the emission-side surface of the liquid crystal panel 925R, respectively. The incidence-side polarizing plate 960R transmits particular polarized-beams of the incident light beams. The liquid crystal panel 925R modulates, in accordance with image information, the red polarized-beams emitted from the incidence-side polarizing plate 960R. The emission-side polarizing plate 961R transmits particular polarized-beams of the modulated light beams emitted by the liquid crystal panel 925R.

The liquid crystal panels 925G and 925B are provided at the incidence-side surface and the emission-side surface thereof with the incidence-side polarizing plates 960G and 960B and the emission-side polarizing plates 961G and 961B, respectively. In the liquid crystal panels 925R, 925G, and 925B according to the present embodiment, for example, a polysilicon TFT may be used as a switching element.

The crossed dichroic prism 910 serves as a colored-light-beam combining optical system which forms a colored image by combining three-colored light beams. The crossed dichroic prism 910 includes a multilayer dielectric film which reflects red light beams and a multilayer dielectric film which reflects blue light beams disposed substantially in an X-shape along the interfaces between four right-angle prisms. Three colored light-beams are combined by these multilayer dielectric films.

The light beams combined by the crossed dichroic prism 910 are emitted toward the projection lens unit 6. The projection lens unit 6 serves as a projection unit for displaying colored images by projecting the combined light beams on a projection area such as a projection screen.

(5) Configuration of the projection lens unit

Figure 6:
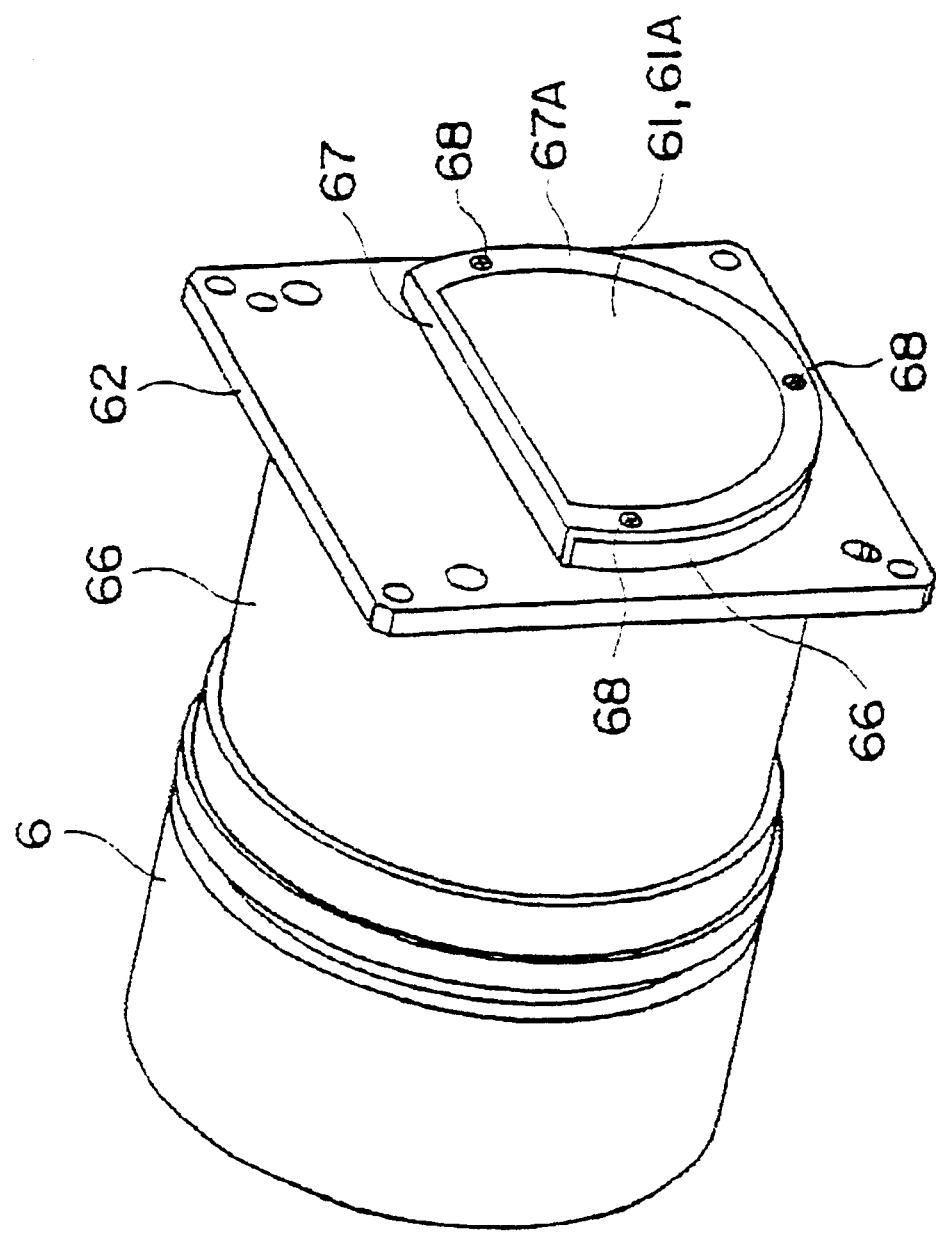
FIG. 6 is a perspective view of a projection lens unit according to the embodiment.
Figure 7:
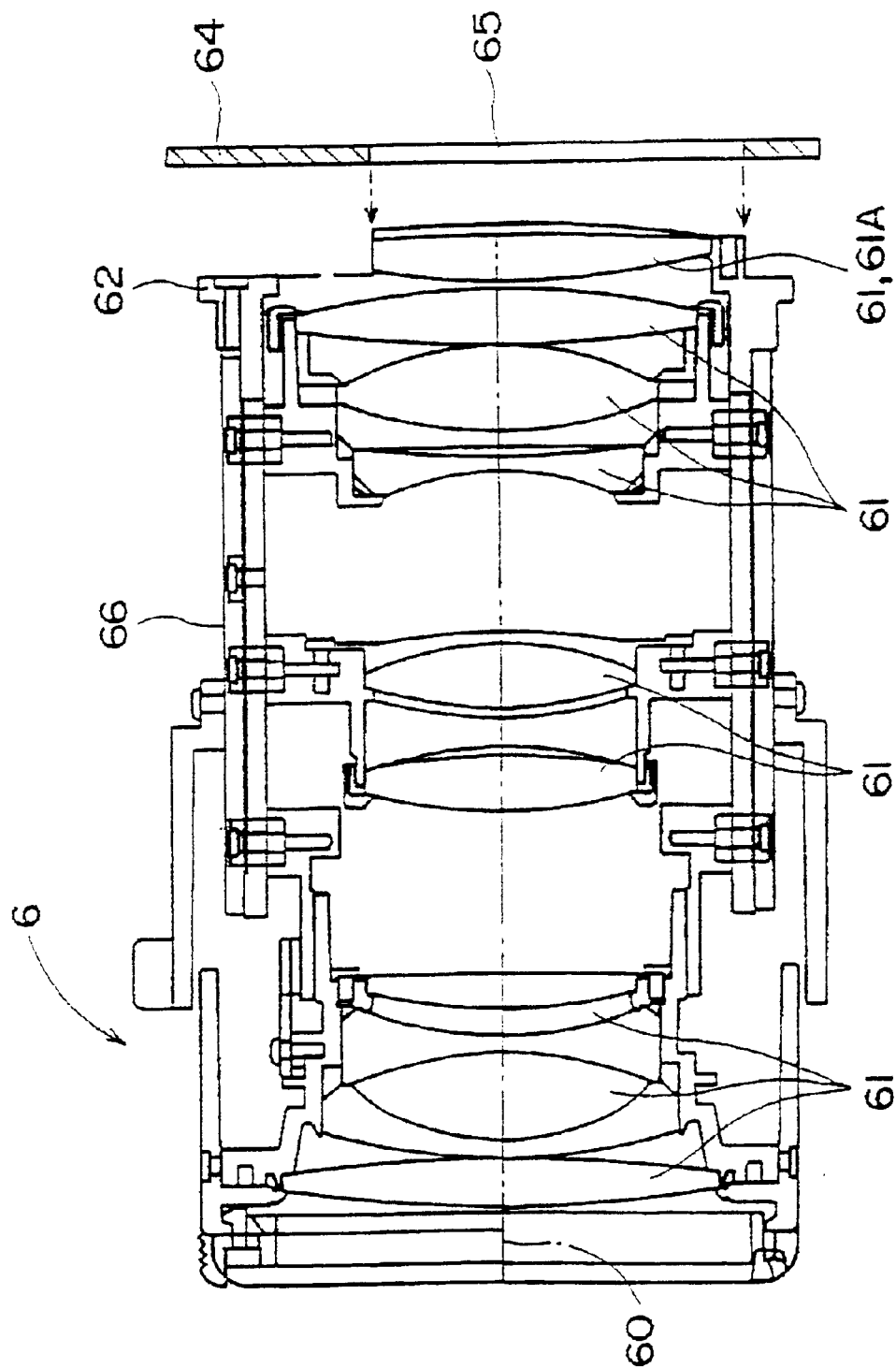
FIG. 7 is a longitudinal-sectional view of the projection lens unit according to the embodiment.
Figure 8:
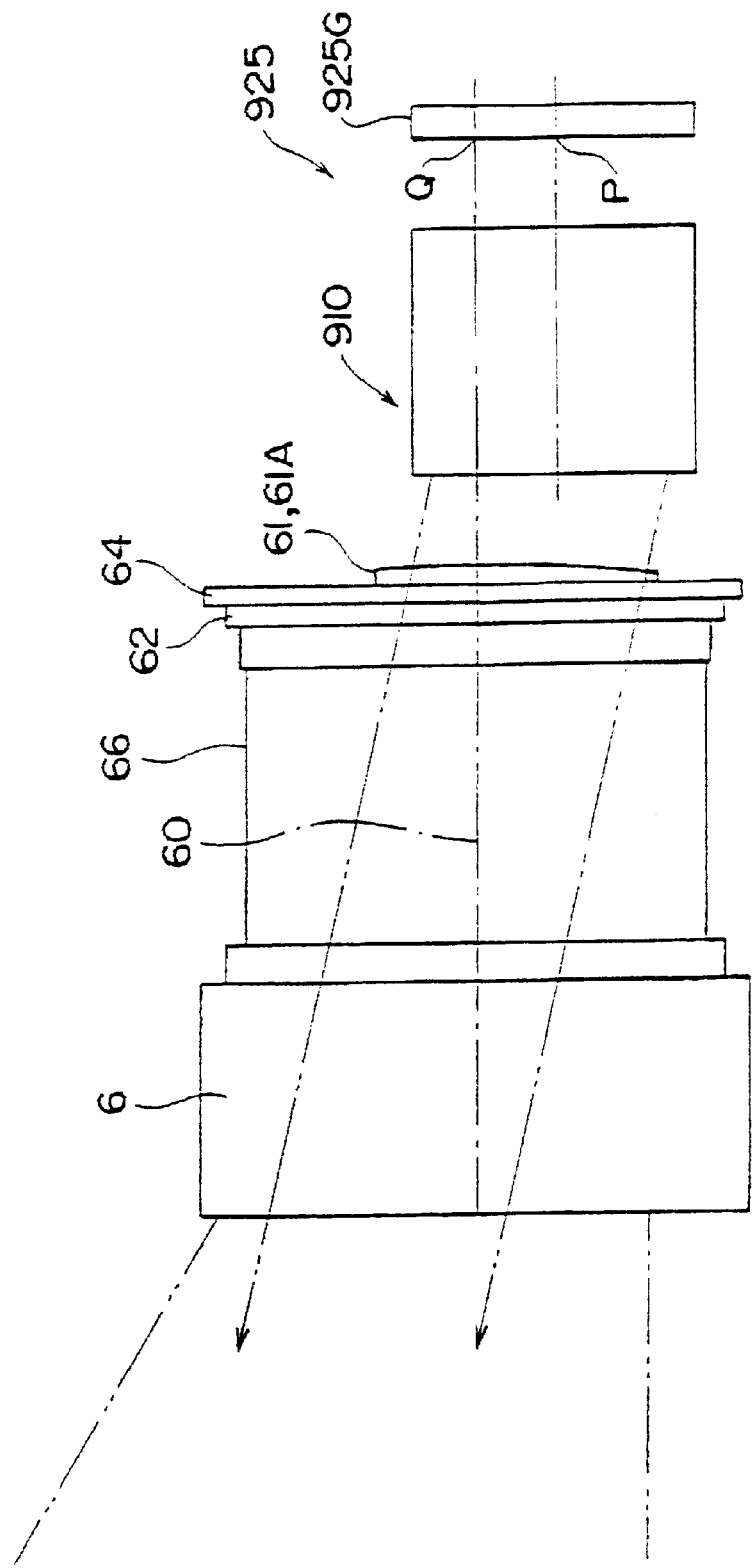
FIG. 8 is a schematic view of optical imaging according to the embodiment.

The configuration of the projection lens unit is shown in FIGS. 6 to 8.

The projection lens unit 6 is fixed to the lower light guide 902 through a head plate 64 serving as a supporting member for supporting the projection lens unit 6 at a base end thereof, as shown in FIG. 4. The projection lens unit 6 including a plurality of lenses 61 disposed along a given axis 60 enlarges and projects an inputted optical image. The plurality of lenses 61 are fixed to the inside of a cylinder 66 configured with a plurality of members. The cylinder 66 is provided with a rectangular flange 62 protruding in the radial directions from the periphery of the cylinder 66, the cylinder 66 being disposed in the vicinity of the base end of the projection lens unit 6. The flange 62 is disposed at the base end toward the other end of the projection lens unit 6.

One lens 61A of the plurality of lenses 61 is cut away at an upper portion thereof. The cylinder 66 is cut away at a portion thereof which is associated with the cut-away portion of the lens 61A. The lens 61A is surrounded by the cylinder at the periphery thereof except the cut-away portion. The cut-away portion of the periphery of the lens 61A is covered by a light-shielding plate 67 so as to prevent dust and light from penetrating into the projection lens unit 6. The plate 67 includes a rim 67A formed along the periphery of the lens 61A, the rim 67A being fixed to the cylinder 66 by three screws 68. The number of lenses having cut-away portions, such as the lens 61A, is set according to the position of the flange 62 to be formed on the projection lens unit 6.

The projection lens unit 6 is fixed to the lower light guide 902 through the head plate 64 as a supporting member for supporting the projection lens unit 6 at the base end thereof. The head plate 64 is formed in a rectangle larger than the outline of the flange 62. The head plate 64 is provided with an opening 65 in a shape corresponding to the outline of the lens 61A. The projection lens unit 6 is inserted in the opening 65 at the base end thereof.

In the projection lens unit according to the present embodiment, the size of the opening 65 can be reduced compared with a case using the normal circular lens 61, because the lens 61A disposed at the base end is cut away at the upper portion thereof, thereby reducing the height of the head plate 64. The. thickness of the head plate 64 can be reduced because the ratio of opened area of the opening 65 to the size of the head plate 64 can be reduced. As shown in FIG. 2, the space above the lens 61A can be used when a cooling fan is disposed above the electrooptical unit 925, because the lens 61A is cut away at the upper portion thereof. With this arrangement, the upper end of the cooling fan 17 does not protrude from the upper side of the head plate 64.

A center P of each image-forming region of the liquid crystal panels 925R, 925G, and 925B as a light modulation unit forming the electrooptical unit 925 is disposed, as shown in FIG. 8, below an intersection Q of a line extending from the axis 60 of the projection lens unit 6 with the liquid crystal panel 925R, 925G, or 925B.

An optical image from the liquid crystal panels 925R, 925G, and 925B is transmitted through the crossed dichroic prism 910, applied to the projection lens unit 6 below the axis 60, transmitted through the projection lens unit 6, and projected so as to be expanded above the axis 60.

(6) Effects of the embodiment

Effects of the above-described embodiment are described as follows.

The height of the head plate 64 for supporting the projection lens unit 6 can be reduced because the lens 61A is cut away at the upper portion thereof, and the cut-away portion is made substantially flat. The space above the lens 61A can be used when the cooling fan 17 is disposed above the electrooptical unit 925 which is disposed in the vicinity of the base end of the projection lens unit 6. With this arrangement, the height of the projector 1 is reduced, thereby making the projector 1 low-profile and reducing the size of the projector 1 because it is not necessary to provide an additional space for receiving the cooling fan 17 in the projector 1.

An optical image formed by the liquid crystal panels 925R, 925G, and 925B is transmitted through the crossed dichroic prism 910, applied to the projection lens unit 6 below the axis 60, transmitted through the projection lens unit 6, and projected to be expanded above the axis 60. With this arrangement, the optical image can be enlarged and projected on a projection area without any problem when the lens 61A is cut away at the upper portion thereof.

The opening 65 is formed in the head plate 64 in a shape corresponding to the shape of the lens 61A, whereby the ratio of the size of the opening 65 to the size of the head plate 64 can be reduced. With this arrangement, sufficient strength can be ensured when the thickness of the head plate 64 is reduced.

(7) Modified embodiments

The present invention is not limited to the embodiment described above, and is described according to the following modified embodiment.

According to the above-described embodiment, one cut-away lens which is the lens 61A is disposed at the base end opposite to the projection direction. A plurality of the cut-away lenses may be provided instead of one lens. In this case, the number of cut-away lenses is set according to the position of the flange 62 formed on the projection lens unit 6. The number is preferably set so as not to affect the optical image from the liquid crystal panels 925R, 925G, and 925B.

Although the head plate is formed in a rectangle according to the above-described embodiment, the head plate may be disc-shaped or in any other shape as long as it supports the projection lens unit.

According to the above-described embodiment, the electrooptical unit 925 includes the TFT-driven liquid crystal panels 925R, 925G, and 925B. The projector according to the present invention may include a light modulation unit of a different driving system.

In the embodiment, the electrooptical unit 925 includes three liquid crystal panels 925R, 925G, and 925B. The invention is not limited to the embodiment described above, and the light modulation unit may include either one liquid crystal panel or two liquid crystal panels.

In the embodiment, the electrooptical unit 925 is formed with panels which include liquid crystal elements. Apart from liquid crystal, the light modulation unit of the projector according to the present invention may include device panels in which plasma elements or micro mirrors are used.

The electrooptical unit 925 according to the embodiment transmits the light fluxes R, G, and B while modulating the same. The invention is not limited to the embodiment described above. A reflecting type light modulation unit which reflects, modulates, and emits the incident light may be used in the projector according to the invention.

The configuration and the shape of the components according to the embodiment of the present invention may be modified subject to embodiments of the invention.

As described above, according to the present invention, a lens is cut away at the upper portion thereof, thereby reducing the height of a member for supporting the projection lens unit and enabling the use of a space above the lens when a cooling fan or the like is disposed above the electrooptical unit disposed in the vicinity of the base end of the projection lens unit. With this arrangement, the projector can be low-profile by reducing the height of the projector including the projection lens unit, and the projector can be reduced in size because it is not necessary to provide an additional space for receiving the cooling fan, or the like, in the projector.

What is claimed is:

1. A projection lens unit that enlarges and projects an input optical image, comprising:

a plurality of lenses disposed along a predetermined axis; and at least one of the plurality of lenses disposed at a base end opposite to a projection direction being cut away at an upper portion thereof such that a space for accommodating a component is provided above at least one of the plurality of lenses.

2. The projection lens unit according to claim 1, a flange, protruding in radial directions from the projection lens unit, being formed at the periphery thereof.

3. The projection lens unit according to claim 2, the flange being formed at the base end toward an other end.

4. The projection lens unit according to claim 1, a supporting member supporting the projection lens unit at a base end thereof with an opening through which the lens is inserted, the opening being formed in accordance with the shape of the base end of the projection lens unit.

5. The projection lens unit according to claim 2, a supporting member supporting the projection lens unit at a base end thereof with an opening through which the lens is inserted, the opening being formed in accordance with the shape of the base end of the projection lens unit.

6. The projection lens unit according to claim 3, a supporting member supporting the projection lens unit at a base end thereof with an opening through which the lens is inserted, the opening being formed in accordance with the shape of the base end of the projection lens unit.

7. A projector, comprising:
an electrooptical unit that forms an optical image in accordance with image information; and
the projection lens unit according to claim 1.

8. The projector according to claim 7, further comprising a supporting member for supporting the projection lens unit at a base end thereof with an opening through which the lens is inserted.

9. The projector according to claim 8, the opening being formed in accordance with the shape of the base end of the projection lens unit.

10. The projector according to claim 7, the center of an image-forming region of a light modulation unit forming the electrooptical unit being disposed below an intersection of a line extending from the axis of the projection lens unit with the light modulation unit.

11. The projector according to claim 8, the center of an image-forming region of a light modulation unit forming the electrooptical unit being disposed below an intersection of a line extending from the axis of the projection lens unit with the light modulation unit.

12. The projector according to claim 9, the center of an image-forming region of a light modulation unit forming the electrooptical unit being disposed below an intersection of a line extending from the axis of the projection lens unit with the light modulation unit.

* * * * *